Dec. 3, 1963   H. S. JACOBS   3,113,229
INDUCED CURRENT ELECTROMAGNETIC TORQUE TRANSMITTING COUPLINGS
Filed Jan. 26, 1959

INVENTOR.
HENRY S. JACOBS
BY
ATTORNEYS

Dec. 3, 1963 H. S. JACOBS 3,113,229
INDUCED CURRENT ELECTROMAGNETIC TORQUE TRANSMITTING COUPLINGS
Filed Jan. 26, 1959 2 Sheets-Sheet 2

INVENTOR.
HENRY S. JACOBS
BY
ATTORNEYS

United States Patent Office 3,113,229
Patented Dec. 3, 1963

3,113,229
INDUCED CURRENT ELECTROMAGNETIC TORQUE TRANSMITTING COUPLINGS
Henry S. Jacobs, Milwaukee, Wis., assignor to Harnischfeger Corporation, Milwaukee, Wis., a corporation of Wisconsin
Filed Jan. 26, 1959, Ser. No. 788,879
2 Claims. (Cl. 310—105)

This invention relates to improvements in induced current electromagnetic torque transmitting couplings, such as brakes and clutches, and to improvements in methods for fabricating same.

Considerable development work has been done on electromagnetic torque couplings in which copper bars and end rings therefore, conventionally in the form of a squirrel cage, are mounted in the face of the ferromagnetic induced current member of the coupling. These couplings conventionally comprise concentric annular members, one or both of which may be mounted for rotation. Attention is invited to U.S. Patents Nos. 2,762,940; 2,773,998; 2,773,204; 2,776,386 and 2,846,601.

In the devices disclosed in the prior patents aforesaid, the bars are held impositively and mechanically in grooves formed in the face of the induced current member. Such bars are free for relative movement with respect to the groove walls of the induced current member. It has been found, however, that the impositive mechanical interconnection of the bars to the induced current member cannot be relied upon in all cases to hold the bars in position. This is particularly true at high speeds of rotor operation and under load conditions pursuant to which the induced current member and bars are subject to wide temperature variations which result in thermal expansion and contraction of the member and bars at unequal rates.

In the methods and apparatus embodying the present invention the bars are positively united to the induced current member. The bars and induced current member cohere to preclude relative movement therebetween. The bond between the bars and induced current member holds the bars in place regardless of thermally induced dislocating forces.

Moreover, for improvement in the slip-torque characteristic of the coupling, a thin facing of copper or like low-resistance electrically conductive material may be bonded to the induced current member over its entire face. For certain advantageous slip-torque characteristics, the bars beneath the facing may be omitted entirely, or their relative dimensions altered as hereinafter explained.

In the preferred practice of the invention the copper or other low-resistance electrically conductive material is united to the ferromagnetic induced current member either metallurgically by depositing the copper in a welding process, by spraying it in molten form, or electroplating it onto the induced current member.

The positive bond thus produced substantially completely eliminates any possibility that the facing or bars will become detached from the induced current member. Moreover, the end rings of the squirrel cage do not tend to come loose. By uniting the bars to the bottom and side walls of the rotor slots, the bars are positively restrained from axial movements which might otherwise tend to push the end rings axially. All thermal stresses are forced to manifest themselves in a radial direction.

In the practice of the present invention the end rings of any squirrel cages so provided will also be positively bonded to the end faces of the ferromagnetic induction member. Accordingly, the tendency of the end rings to expand and contract circumferentially is substantially completely eliminated because of the positive bond between the end rings and the induced current member. Such expansion and contraction as takes place will be forced to occur radially and axially.

Other objects, advantages and features of the invention will appear from the following disclosure in which.

Figure 6:
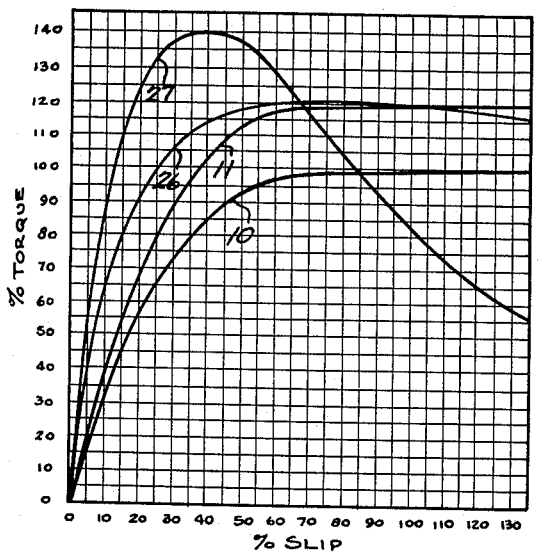
FIG. 6 is a graph showing slip torque characteristics of electromagnetic torque couplings embodying various modifications of my invention.

The slip torque characteristic curve 10 shown in FIG. 6 is typical for an electromagnetic torque coupling having an unlaminated ferromagnetic induced current rotor member of low carbon steel content. The field member may have either salient or toroid poles. Such a device is illustrated in copending U.S. patent application Serial No. 723,303 filed March 24, 1958, now abandoned. The induced current member thereof has a continuous surface and a radially expandable support spider.

Figure 1:
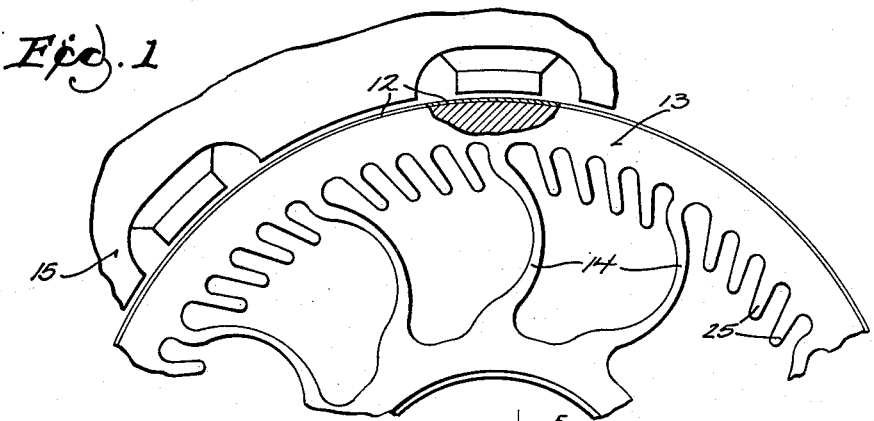
FIG. 1 is a fragmentary cross section taken through one embodiment of my invention.

According to one aspect of the present invention, the continuous surface of such an induced current member is faced with a thin layer of low-resistance electrically conductive material such as copper. The torque transmitted by a coupling so modified is increased materially, as shown by slip-torque characteristic curve 11 in FIG. 6. Such a facing 12 is illustrated in FIG. 1 as applied to a continuous rim 13 of an electromagnetic torque coupling which desirably has a radially expandable support spider including serpentine spokes 14, as shown in the copending application aforesaid.

The reason for the increased torque transmission is believed to be as follows. The ability of the coupling to transmit torque is dependent both on the resistance and the reactance of the inductor member. If the copper facing 12 is kept thin enough so that the effective air gap between the field member 15 (which may be toroidal or salient pole and is shown diagrammatically in this disclosure) and the magnetic material 13 of the inductor is not unduly increased, the reduced resistance at the face of the inductor member will permit increased flow of induced current and hence result in increased torque transmission. The facing 12 should desirably be in the range of .01 to .02 inch (10 to 20 mils) in thickness. Torque transmission can be increased approximately 1 percent for each mil of copper facing thickness up to about 20 mils. If the thickness of the copper is further increased, the effective air gap is so increased that torque transmission will be reduced. The increase in torque is most apparent at low slip speeds. As slip speed increases, the inductive reactance of the bars will impede current flow.

Figure 7:
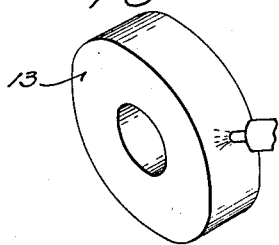
FIG. 7 is a diagrammatic view in perspective illustrating the method of spraying the copper face onto the induced current member.
Figure 8:
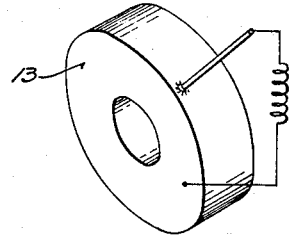
FIG. 8 is a diagrammatic view in perspective illustrating the method of welding the copper bars and face to the induced current member.
Figure 10:
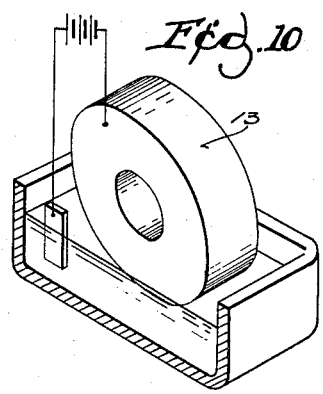
FIG. 10 is a diagrammatic view in perspective illustrating the method of electroplating the copper face onto the induced current member.

According to the present invention the facing 12 may be applied to the steel inductor member 13 by any process that will result in a coherent bond between the facing and induced current member. The parts must be positively united to achieve the advantages of the present invention. For this purpose the bond may be effected by spraying, electroplating, welding, or the like. The copper metal is sprayed while in a molten state. The inductor body may be cold. When welded a de-oxidized copper electrode is used in a conventional inert gas-shielded arc welding process. The copper from the weld rod is deposited on the face of the inductor body and is metallurgically bonded thereto.

Where the copper is sprayed onto the conductor, as suggested in FIG. 7, the thickness of the copper can be accurately controlled in the spraying operation and no substantial machining away of excess copper will thereafter be required. Where the copper is welded to the face of the inductor, as suggested in FIG. 8, it will usually be necessary to deposit the copper to a thickness considerably in excess of that desired. The unwanted excess is machined away in a subsequent operation. Where the copper is electroplated to the induced current member, as suggested in FIG. 10, the member may be rotated over an electroplating bath in which only the portion of the rim on which the copper is to be deposited is immersed.

Other slip torque characteristics can be achieved in couplings embodying the present invention either independently of a continuous facing 12 or in addition thereto by bonding a squirrel cage of low-resistance metal to the inductor face. This may be accomplished by first slotting the induced current member 13 axially. Copper or other low-resistance electrically conductive material is then deposited in the slots, desirably by welding. As aforestated, the bars are positively metallurgically bonded to the ferromagnetic inductor body instead of being impositively mechanically connected thereto. In some cases the ends of the bars are left unconnected, but usually they will be interconnected in a squirrel cage pattern by the addition of end rings deposited in a similar welding process to the end faces of the rotor and intersecting the ends of the bars.

Figure 2:
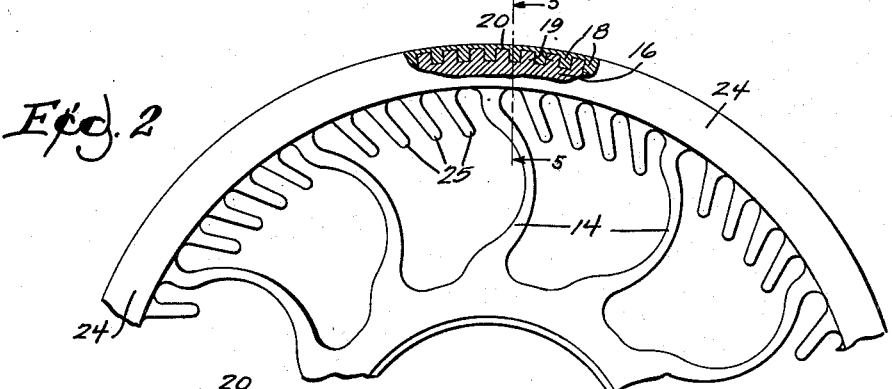
FIG. 2 is a fragmentary cross section taken through another embodiment of my invention.
Figure 3:
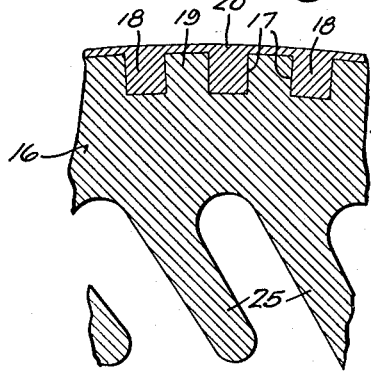
FIG. 3 is a greatly enlarged fragmentary cross section of the embodiment shown in FIG. 2.
Figure 4:
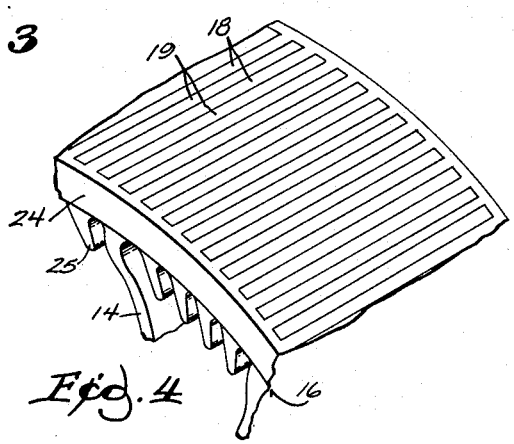
FIG. 4 is a fragmentary perspective view of a rotor for an electromagnetic torque coupling including a squirrel cage embodying the present invention.
Figure 5:
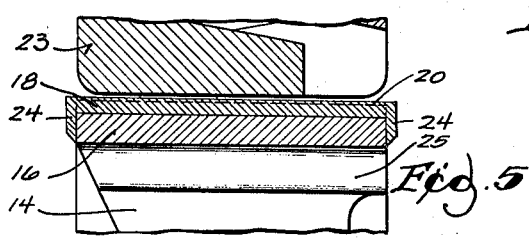
FIG. 5 is a fragmentary cross section taken on line 5—5 of FIG. 2.

FIGS. 2, 3, 4 and 5 illustrate such a structure. The magnetic inductor body 16 is provided with axial slots 17 in which bars 18 of copper or the like have been deposited as aforestated. Inductor teeth 19 intervene between the bars. As best shown in FIGS. 4 and 5, end rings 24 may similarly be metallurgically bonded to the side faces of rotor 16. The end rings 24 intersect the bars 18 and complete low resistance current paths between bars. I may also apply over the entire composite surface of the rotor a face coating 20 of thin copper of the same character as the facing 12 shown in FIG. 1. FIG. 4 shows the rotor before coating 20 is applied. FIGS. 2, 3 and 5 show the rotor after the coating 20 is applied.

As aforestated, bars 18 are deposited by the inert gas shielded metal arc (S.I.G.M.A.) welding process aforesaid. The bars 18 are desirably no wider than the teeth portions 19 therebetween and are desirably somewhat narrower. The bars should occupy no more than 50 percent of the area of the inductor face and may range downwardly to about 35 percent. If the bars are made any wider than aforestated, the teeth 19 therebetween have insufficient area to transmit electromagnetic flux and will tend to become saturated with magnetic flux generated in the field 23. This would reduce the torque transmitting capacity of the coupling.

Moreover, the bars 18 should be at least as wide as they are deep to facilitate the welding process. If the bars are any deeper than they are wide, it will be difficult to control the arc during the welding process. The arc would tend to form between the side walls of the slots 17 and the welding electrode, thus bypassing the bottom wall of the slots.

In practice the slots are sandblasted before the copper is deposited therein. The inductor is machined to give a slightly larger air gap than will ultimately be required and the copper is then deposited as aforesaid. When the slots 17 are filled substantially flush with the top of teeth 19, the facing 20 may be applied in like manner. In the welding process an excess of copper is applied which is thereafter machined off to produce the desired air gap.

With the bars and facing thus positively bonded to the inductor, the temperature change to which the inductor is subject in use will have no effect upon the bond. The inductor can be heated as high as 350 or 400° C. without disrupting the bond. The positive bond between the bar and the inductor will preclude thermally induced axial movement of the bar. Inasmuch as the top of the slot 17 is open, the bar is relatively free to expand radially. Accordingly, all thermal stresses will be accommodated by radial expansions and contractions of the bar. This is particularly important when end rings 24 are welded to the ends of the bars 18 as is desired for certain torque-slip characteristics. Thus changes in temperature will not cause the bars to force the end rings axially away from the ends of the inductor. Moreover, by metallurgically bonding the end rings to the inductor 16, circumferential expansion and contraction of the end rings is precluded. All expansion and contraction of the end rings will occur radially and axially.

An additional advantage is achieved in the device of the present invention. At high slip frequencies, the induced currents tend to flow very near the surface of the inductor. Heat therefore tends to concentrate in a facing which is wholly copper and a good conductor of heat. Copper is approximately eight times as good a conductor of heat as steel. This heat is then conducted rapidly through the copper bars and facing into the steel inductor body 16. The construction shown in FIG. 3 acts as a better heat dissipator than the construction of FIG. 1, because the area of contact between the copper and steel in FIG. 3 is approximately about twice as great as the area of contact between the copper and steel in the construction of FIG. 1. Heat generated in the air gap surface of the rotor is ultimately dissipated in the cooling fins 25. Hence, rapid conduction of heat from the copper into the steel inductor body 16 is advantageous.

The slip-torque characteristic for a construction such as shown in FIG. 39 and in which the bars 18 are relatively shallow is shown by curve 26 in FIG. 5. Because of the further reduced resistance in the face of the inductor promoting larger flow of current (as compared to the FIG. 1 construction and curve 11 of FIG. 6), there is a sharp increase in current at low slip. However, at high slip where the inductive reactance of the bars 18 has a more pronounced effect, there will be some drop-off in torque. Curve 27 of FIG. 5 is characteristic of an inductor with relatively deep inductor bars, heavy end rings 24, and a thin copper coating over the entire face of the inductor. Here again at low slip there is a marked increase in torque which falls off rapidly at high slip speeds.

The inductor will be fabricated depending upon the type of slip-torque characteristic which is desired. In all cases, however, the slip-torque characteristic can be improved by applying copper to the surface of the inductor either in an axial bar pattern, a squirrel cage pattern, a continuous surface facing, or combination thereof.

Figure 9:
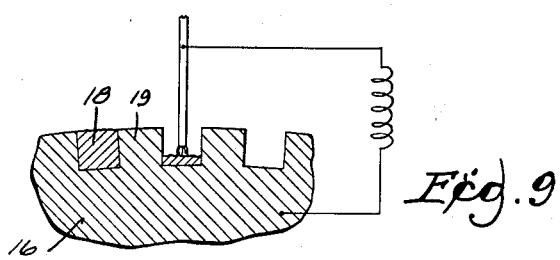
FIG. 9 is a fragmentary enlarged cross section through the grooved rim of an induced current member and diagrammatically illustrating the method of welding bars into the grooves.

While the method of the invention is believed to be clear from the foregoing description, it will be re-stated as follows. An unlaminated induced current body member is first fabricated. Where only a facing of copper or like low resistance electrically conductive material is to be applied, it can be sprayed, welded or plated, or otherwise united to the body as is respectively suggested in FIGS. 7, 8 and 10. In all such cases the copper is positively bonded to the inductor.

Where copper bars or a copper squirrel cage is to be provided, the prefabricated induced current body member is first slotted and copper is deposited by welding into the slots, as suggested in FIG. 9. Copper end rings are then welded onto the end faces of the induced current body member to intersect the ends of the bars. The peripheral surface of the induced current member and included bars and end rings is then faced with copper, using any of the methods suggested in FIGS. 7, 8 and 10 or their equivalents.

Depending on the specific slip-torque characteristic desired, any combination or sub-combination of the above steps can be used. For example, for curve 11 of FIG. 6, the induced current body member is simply faced with copper. No bars are included. For curve 26 of FIG. 6 shallow bars without end rings but with a copper facing is used. For curve 27 relatively deep bars with heavy end rings and a copper facing is used. Other variations will suggest themselves to those skilled in the art.

I claim:
1. An electromagnetic torque coupling comprising a field member and an induced current member separated by an air gap, said induced current member being subject to be heated as high as about 350° C. and comprising a body of unlaminated ferromagnetic material and a substantially coextensive facing comprising a thin layer of low resistance electrically conductive material positively united to said body and adjacent said air gap, in further combination with bars of low resistance electrically conductive material metallurgically bonded to said body and beneath said facing, said bars being electrically directly connected to said facing and said body being correspondingly grooved to receive said bars.

2. An electromagnetic torque coupling comprising a field member and an induced current member separated by an air gap, said induced current member being subject to be heated as high as about 350° C. and comprising a body of unlaminated ferromagnetic material and a substantially coextensive facing comprising a thin layer of low resistance electrically conductive material positively united to said body and adjacent said air gap, in further combination with a squirrel cage comprising bars of low resistance electrically conductive material within said body and beneath said facing, said bars being electrically connected directly to said facing and said body being correspondingly grooved to receive said bars, and end rings of low resistance electrically conductive material connecting the ends of said bars, said bars and facing being metallurgically bonded to said body.

References Cited in the file of this patent

UNITED STATES PATENTS

| | | |
|---|---|---|
| 2,419,837 | Hugin | Apr. 29, 1947 |
| 2,421,860 | Winther | June 10, 1947 |
| 2,462,451 | Winther | Feb. 22, 1949 |
| 2,696,570 | Pandapas | Dec. 7, 1954 |
| 2,773,206 | Zozulin | Dec. 4, 1956 |
| 2,880,335 | Dexter | Mar. 31, 1959 |

FOREIGN PATENTS

| | | |
|---|---|---|
| 183,845 | Great Britain | Aug. 23, 1923 |
| 552,428 | Germany | June 15, 1932 |